United States Patent
Taguchi

(10) Patent No.: US 6,881,454 B2
(45) Date of Patent: *Apr. 19, 2005

(54) SUBSTANTIALLY COLORLESS AND OPTICALLY ANISOTROPIC MATERIAL

(75) Inventor: Keiichi Taguchi, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/450,404
(22) PCT Filed: Dec. 14, 2001
(86) PCT No.: PCT/JP01/11000
   § 371 (c)(1), (2), (4) Date: Jun. 13, 2003
(87) PCT Pub. No.: WO02/48759
   PCT Pub. Date: Jun. 20, 2002

(65) Prior Publication Data
   US 2004/0041124 A1 Mar. 4, 2004

(30) Foreign Application Priority Data
   Dec. 14, 2000 (JP) ......... 2000-380606

(51) Int. Cl.⁷ .......... G02B 5/30; C09K 19/52; B05D 5/06
(52) U.S. Cl. .......... 428/1.1; 428/1.3; 428/1.31; 252/299.01; 516/900; 359/489; 427/162
(58) Field of Search .......... 428/1.1, 1.3, 1.31; 359/489; 427/162; 252/299.01; 516/900

(56) References Cited

U.S. PATENT DOCUMENTS

| 5,739,296 A | * | 4/1998 | Gvon et al. ......... 534/577 |
| 6,399,166 B1 | * | 6/2002 | Khan et al. ......... 428/1.31 |
| 6,551,529 B1 | * | 4/2003 | Taguchi et al. ......... 252/585 |
| 6,583,284 B1 | * | 6/2003 | Sidorenko et al. ......... 544/342 |

FOREIGN PATENT DOCUMENTS

| JP | 10-333154 A | 12/1998 |
| JP | 2000-226415 A | 8/2000 |
| JP | 2000-226448 A | 8/2000 |
| WO | 94/28073 A1 | 12/1994 |
| WO | 97/39380 A1 | 10/1997 |

OTHER PUBLICATIONS

Search Report Issued in International Application No. PCT/JP01/11000, Mar. 26, 2002.

* cited by examiner

Primary Examiner—Shean C. Wu
(74) Attorney, Agent, or Firm—Burns, Doane, Swecker & Mathis, L.L.P.

(57) ABSTRACT

A substantially colorless and optically anisotropic material is obtained from substantially colorless and optically anisotropic micelles. The micelles are oriented in a definite direction. The optically anisotropic material is usable in optical films and polarization elements.

15 Claims, 2 Drawing Sheets

SUBSTANTIALLY COLORLESS AND OPTICALLY ANISOTROPIC MATERIAL

FIELD OF INVENTION

The present invention relates to a substantially colorless and optically anisotropic material. The invention also relates to an optical film and a polarizing element using substantially colorless and optically anisotropic micelles.

BACKGROUND OF INVENTION

A polarizing element is used in a liquid crystal display. The polarizing element generally comprises a polarizing membrane and a transparent protective film.

The polarizing membrane usually comprises a polymer film containing iodine or a dichromatic dye. The iodine or the dichromatic dye is incorporated in or adsorbed on a polymer film. The film is then subjected to a uniaxial stretching. Polyvinyl alcohol is generally used as the polymer. The dichromatic dye can be adsorbed on a polymer film that is previously subjected to a uniaxial stretching to prepare a polarizing membrane.

The transparent protective film generally is a cellulose triacetate film. The polarizing membrane is usually provided between two transparent protective films.

A conventional polarizing element comprises a polarizing membrane formed by stretching a polymer film. Therefore, the direction of orientation is restricted in a certain direction.

Japanese Patent Provisional Publication No. 7(1995)-261024 discloses a method for preparing a polarizing plate. In the method, a layer containing optical active molecules and another layer containing a dichromatic dye are formed on a substrate, and then exposed to light so that the dichromatic dye molecules are aligned in a definite direction. According to this method, a polarizing plate having a polarizing axis in the definite direction can be produced without stretching. However, it takes such long time to align the dye molecules by light-exposure that a long band-shaped plate cannot be continuously treated by this method. Further, the alignment oriented in the plane by light-exposure is poor in evenness. Furthermore, a polarization degree (which is the most important matter as a polarizing plate) of the resultant plate is relatively poor, as compared with a conventional polarizing plate.

J. F. Dreyer (J. Phys. Colloid Chem., 808(1948), pp. 52) proposes a method in which a glass plate or a polymer film is beforehand subjected to rubbing treatment (beforehand rubbed with cloth or paper in a definite direction) and onto the treated surface a dichromatic dye is adsorbed. However, thus obtained orientation is liable to relax under the circumstances of high temperature and humidity, and accordingly the alignment of dichromatic dye molecules is often disturbed to lower the polarization degree.

Japanese Patent Provisional Publication Nos. 3(1991)-54506 and 3(1991)-58004 disclose another method for preparing a polarizing plate. In the method, a film of cellulose triacetate or polyethylene terephthalate is subjected to the rubbing treatment, and then the dye is added. However, even the thus produced polarizing plate exhibits a low polarization degree.

U.S. Pat. Nos. 2,400,877 and 2,544,659 disclose a process for preparation of a polarizing element. The process comprises the steps of: applying a solution of dichromatic dye onto a substrate, evaporating the solvent while molecules of the dye are aligned in a nematic phase, and fixing the alignment slowly. The resultant polarizing element, however, exhibits a low polarization degree, and is poor in heat-resistance.

SUMMARY OF THE INVENTION

A liquid crystal display has advantages of thin shape and lightweight. Recently, in order to make the display much thinner and lighter, it has been tried to make parts of the display further smaller, thinner and lighter. However, with respect to a polarizing plate (which is indispensable to a liquid crystal display), such an improved plate that can take the place of a conventional one has not been developed yet.

The most fundamental problem of conventional polarizing plate resides in that a film of polyvinyl alcohol is liable to tear in the stretching direction. Therefore, it is necessary to provide a transparent protective film on each side of the film, and accordingly the polarizing plate and, consequently, the resultant display are thickened. Further, since the stretched polyvinyl alcohol film shrinks or expands according to fluctuation of temperature or humidity, adhesive between the polarizing plate and a glass plate of liquid crystal cell often comes off.

In a practical process for producing a polarizing plate, the plate is produced in the form of a long band or a roll thereof. In that case, the polyvinyl alcohol film can be oriented in only one direction (namely, in either longitudinal or lateral direction of the film). Accordingly, the polarizing axis is necessarily either parallel or perpendicular to the longitudinal direction. On the other hand, when the polarizing plate is installed in a liquid crystal display, the plate is normally placed so that its polarizing axis is at the angle of 45° to the longitudinal direction of the display. The plate, therefore, must be processed to place the polarizing axis at the angle of 45° to the longitudinal direction and, at the same time, to be in a rectangular shape. However, it is a problem that this process has a very poor production yield.

An object of the present invention is to provide an optically anisotropic material that can be easily oriented in a definite direction without stretching.

Another object of the invention is to provide an optical film that can be easily produced with a good yield.

Further, still another object of the invention is to provide a polarizing element that has a high polarization degree, that exhibits low viewing-angle dependence and that can be easily produced.

The present invention provides an optically anisotropic material comprising substantially colorless and optically anisotropic micelles that are oriented in a definite direction.

The invention also provides an optical film comprising a transparent support and an optically anisotropic layer, wherein the optical anisotropic layer comprises a compound having two aromatic melamine groups represented by the formula (I):

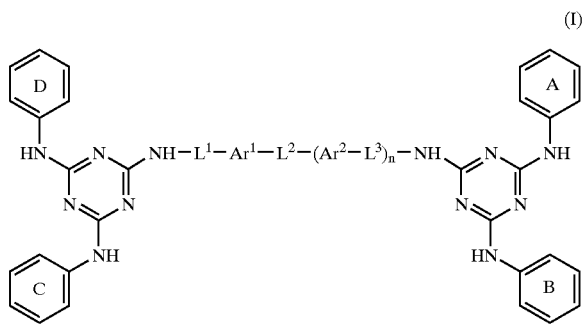

(I)

in which each of $L^1$ and $L^3$ independently is a single bond or an alkylene group having 1 to 6 carbon atoms; $L^2$ is a single bond, an alkylene group having 1 to 6 carbon atoms, —O—, —S— or —NH—; each of $Ar^1$ and $Ar^2$ independently is phenylene or naphthylene; n is 0 or 1; and at least one of the benzene rings A, B, C and D has sulfo or a salt thereof as a substituent group.

The invention further provides a polarizing element comprising a layer in which substantially colorless and optically anisotropic micelles are oriented in a definite direction and in which a dichromatic dye is present along the oriented direction of the optically anisotropic micelles to polarize light transmitted through the element.

The invention furthermore provides a method for orientation of optically anisotropic micelles comprising steps of: applying force to substantially colorless and optically anisotropic micelles to orient the micelles in a definite direction; and then relaxing the force.

The invention still further provides a process for preparation of an optical film comprising a step of coating a transparent support with a dispersion of substantially colorless and optically anisotropic micelles according to a bar-coating method, a die-coating method or a blade-coating method to form an optically anisotropic layer on the transparent support.

According to the present invention, a polarizing element excellent in polarizing light can be easily obtained through a coating process. Thus obtained element exhibits low viewing-angle dependence.

Figure 1:
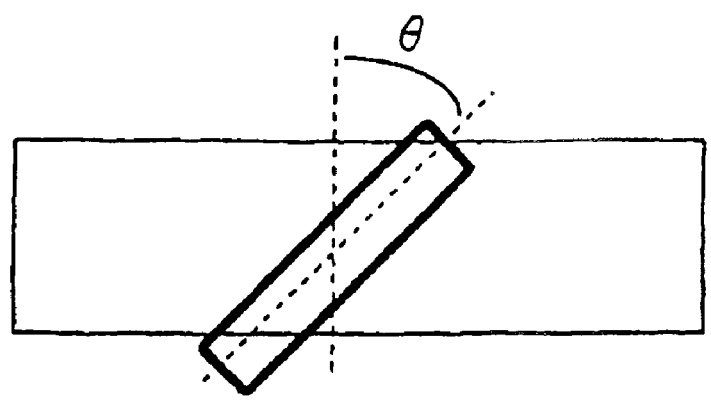
FIG. 1 schematically illustrates an inclined angle of a coating bar to a support that has a shape showing a longitudinal direction.

DETAILED DESCRIPTION OF INVENTION
(Substantially Colorless and Optically Anisotropic Micelle)

In the present invention, substantially colorless and optically anisotropic micelle is used as an optically anisotropic substance. The term "substantially colorless" means that a film of the substance having the thickness of 0.5 μm exhibits an absorbance of 0.2 or less within the visible wavelength region.

The optically anisotropic micelle can be formed from a water-soluble organic compound. As the water-soluble organic compound, an amphiphilic compound or liquid crystal (which associates by itself to form an lyotropic phase in water) is preferably used. Examples of the compound include cromolyn sodium, disodium cromoglicate, and a compound having two aromatic melamine groups. The compound having two aromatic melamine groups is particularly preferred.

The compound having two aromatic melamine groups is preferably represented by the following formula (I).

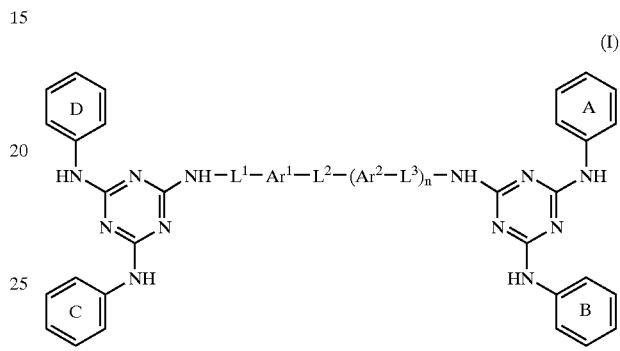

(I)

In the formula (I), each of $L^1$ and $L^3$ is independently a single bond or an alkylene group having 1 to 6 carbon atoms. Each of $L^1$ and $L^3$ independently is preferably a single bond or an alkylene group having 1 to 4 carbon atoms, more preferably a single bond, methylene or ethylene, most preferably a single bond or methylene.

In the formula (I), $L^2$ is a single bond, an alkylene group having 1 to 6 carbon atoms, —O—, —S— or —NH—. In the case where n is 0, $L^2$ is preferably a single bond or an alkylene group having 1 to 6 carbon atoms, more preferably a single bond or an alkylene group having 1 to 4 carbon atoms, further preferably a single bond, methylene or ethylene, and most preferably a single bond or methylene. In the case where n is 1, $L^2$ is preferably an alkylene group having 1 to 6 carbon atoms, —O— or —NH—, more preferably an alkylene group having 1 to 4 carbon atoms, —O— or —NH—, most preferably methylene, ethylene —O— or —NH—.

In the formula (I), each of $Ar^1$ and $Ar^2$ is independently phenylene or naphthylene. Phenylene is preferred to naphthylene, and p-phenylene is most preferred.

In the formula (I), n is 0 or 1.

In the formula (I), at least one of the benzene rings A, B, C and D has sulfo or a salt thereof as a substituent group. Preferably, at least two of the benzene rings A, B, C and D individually have sulfo or a salt thereof as a substituent group. There is no particular restriction on the (o—, m— or p—) position at which the substituent group (sulfo or a salt thereof) is placed.

A cation with which the sulfo forms a salt is preferably an alkali metal (e.g., sodium, potassium) ion, an alkaline earth metal (e.g., magnesium) ion, a light metal of the IIIA group (e.g., aluminum) ion, ammonium ion, or an organic ammonium ion (derived from a primary, secondary or tertiary amine). Proton (hydrogen ion), an alkali metal ion and ammonium ion are more preferred, and an alkali metal ion is most preferred.

The compound having two aromatic melamine groups is more preferably represented by the following formula (IIa), (IIb), (IIc), (IId) or (IIe).

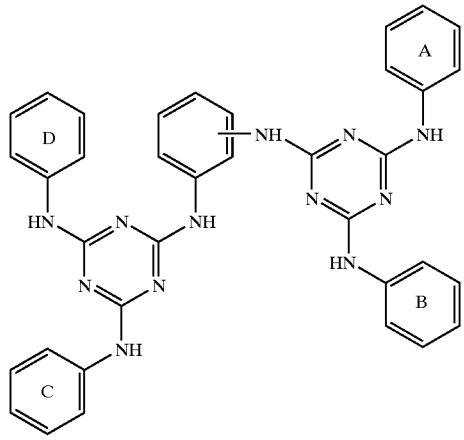

(IIa)

In the formula (IIa), at least one of the benzene rings A, B, C and D has sulfo or a salt thereof as a substituent group. Examples and definition of the substituent group are the same as in the formula (I).

an alkylene group having 1 to 6 carbon atoms, —O— or —NH—, more preferably an alkylene group having 1 to 4 carbon atoms, —O— or —NH—, most preferably methylene, ethylene —O— or —NH—.

In the formula (IIb), at least one of the benzene rings A, B, C and D has sulfo or a salt thereof as a substituent group. Examples and definition of the substituent group are the same as in the formula (I).

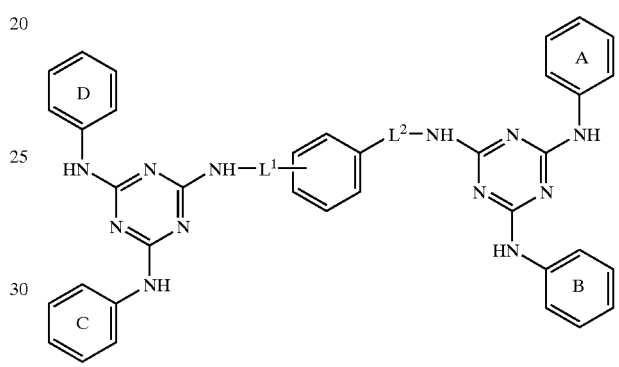

(IIc)

In the formula (IIc), each of $L^1$ and $L^3$ is independently an alkylene group having 1 to 6 carbon atoms. Each of $L^1$

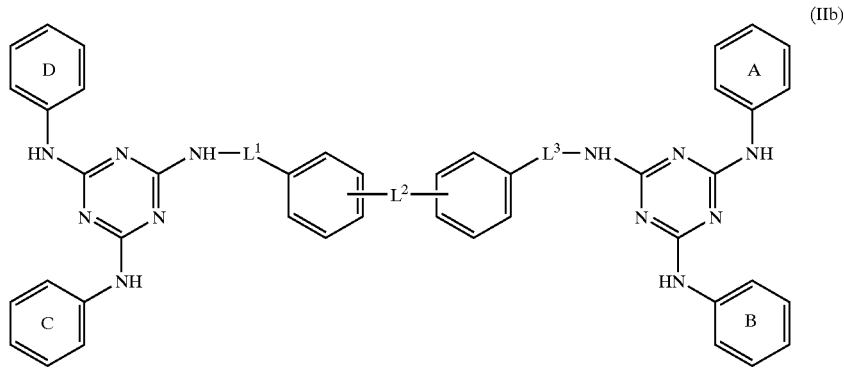

(IIb)

In the formula (IIb), each of $L^1$ and $L^3$ is independently an alkylene group having 1 to 6 carbon atoms. Each of $L^1$ and $L^3$ independently is preferably an alkylene group having 1 to 4 carbon atoms, more preferably methylene or ethylene, most preferably methylene.

In the formula (IIb), $L^2$ is an alkylene group having 1 to 6 carbon atoms, —O—, —S— or —NH—. $L^2$ is preferably and $L^3$ independently is preferably an alkylene group having 1 to 4 carbon atoms, more preferably methylene or ethylene, most preferably methylene.

In the formula (IIc), at least one of the benzene rings A, B, C and D has sulfo or a salt thereof as a substituent group. Examples and definition of the substituent group are the same as in the formula (I).

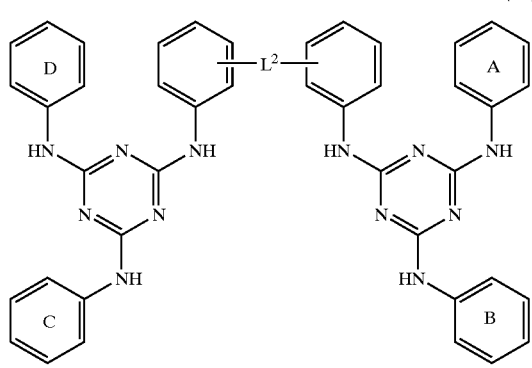

(IId)

In the formula (IId), $L^2$ is an alkylene group having 1 to 6 carbon atoms, —O—, —S— or —NH—. $L^2$ is preferably an alkylene group having 1 to 6 carbon atoms, —O— or —NH—, more preferably an alkylene group having 1 to 4 carbon atoms, —O— or —NH—, most preferably methylene, ethylene —O— or —NH—.

In the formula (IId), at least one of the benzene rings A, B, C and D has sulfo or a salt thereof as a substituent group. Examples and definition of the substituent group are the same as in the formula (I).

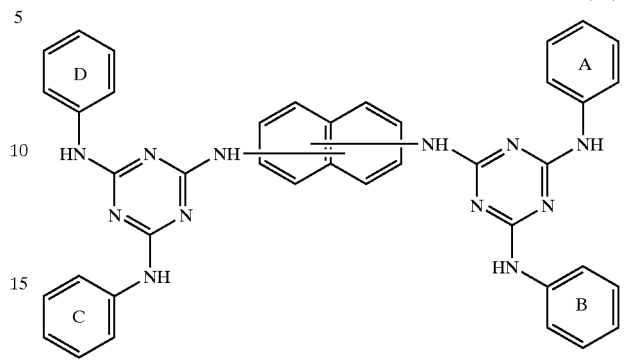

(IIe)

In the formula (IIe), at least one of the benzene rings A, B, C and D has sulfo or a salt thereof as a substituent group. Examples and definition of the substituent group are the same as in the formula (I).

Examples of the compounds having two aromatic melamine groups represented by the formula (I) are shown below.

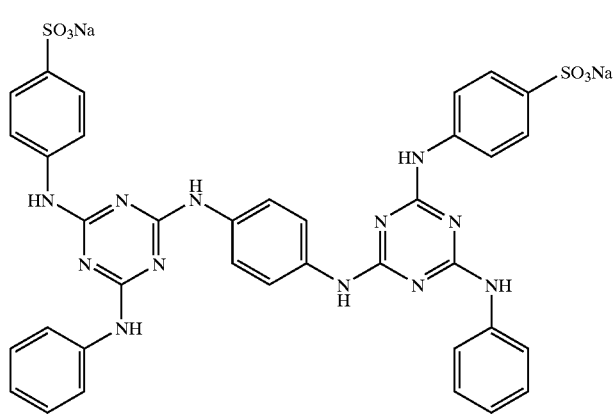

(1)

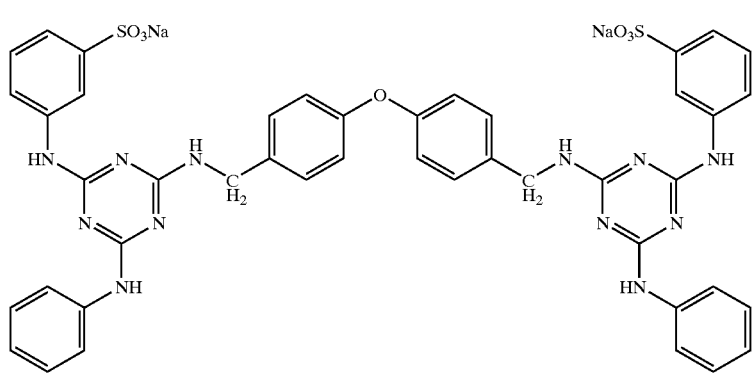

(2)

(3)
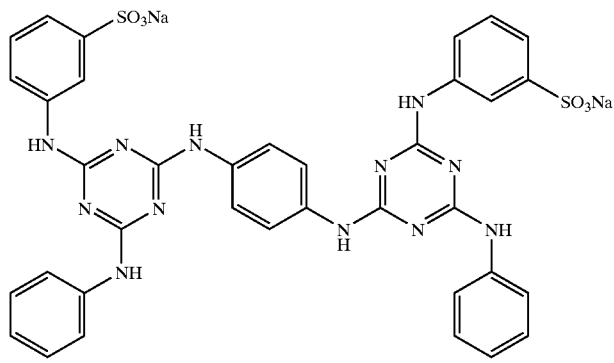
(4)
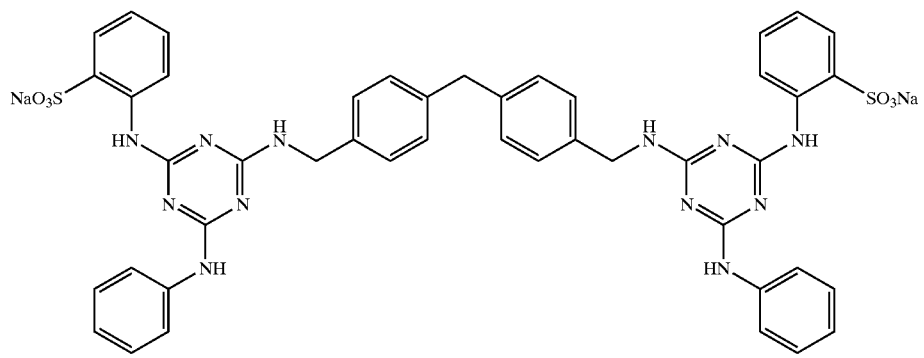
(5)
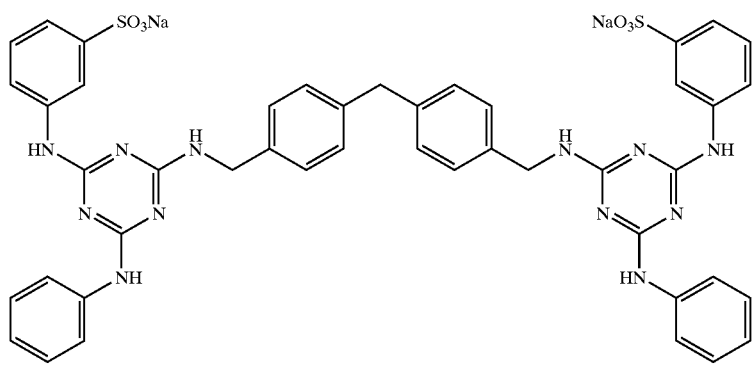
(6)
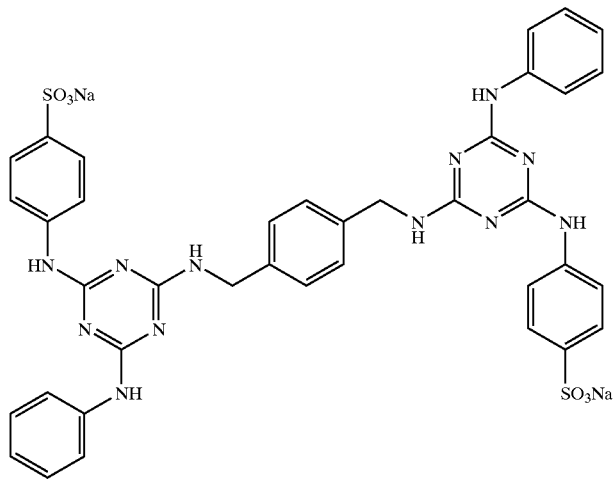

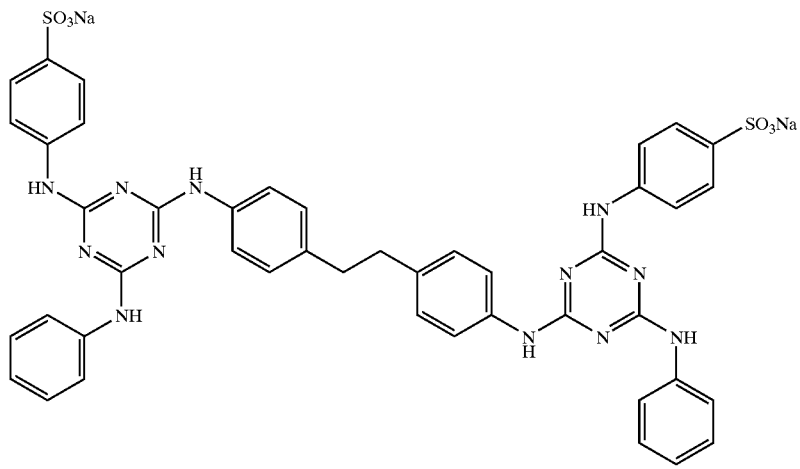
(7)
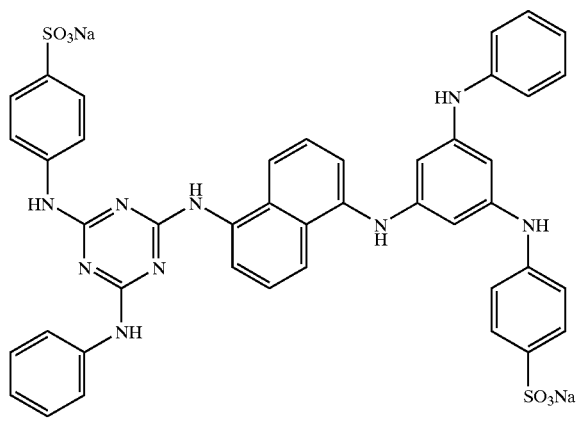
(8)
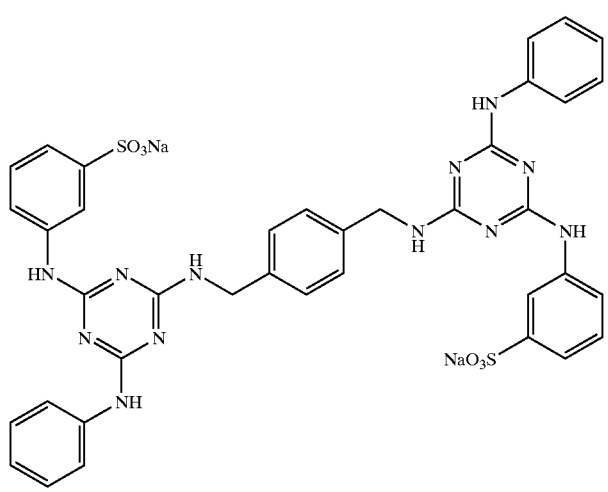
(9)

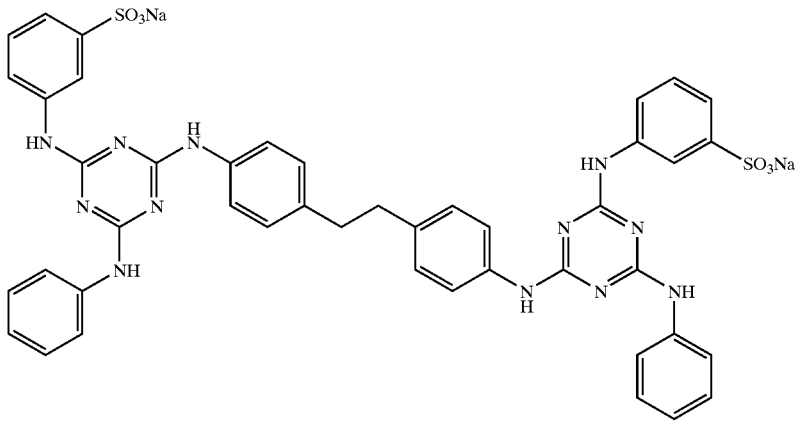

(10)

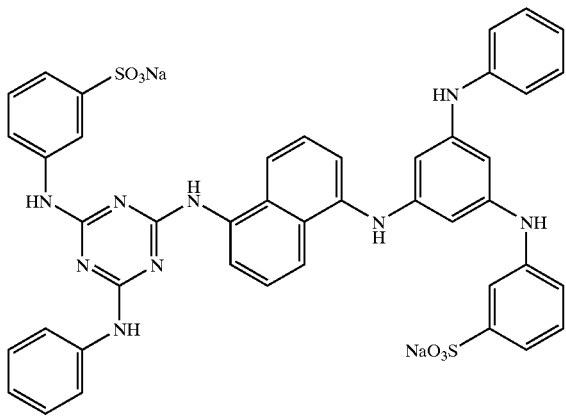

(11)

The compound having two aromatic melamine groups represented by the formula (I) can be easily prepared from known starting materials or intermediates, according to the method described in U.S. Pat. Nos. 3,754,923, 3,671,253 and other references (e.g., Yutaka Hosoda, "Ronri Seizo Senryo Kagaku [Logical preparation process in dye chemistry (Japanese)], Giho-do).

The above compound is dissolved, emulsified or dispersed in an appropriate medium to form micelle. The obtained micelle is substantially colorless, and has characters of lyotropic liquid crystal.

The medium is preferably water or a hydrophilic solvent, more preferably water or an alcohol, most preferably water.

The micelle exhibiting a lyotropic liquid crystal phase generally forms a rod-like or hexagonal phase. In addition, the compound having two aromatic melamine groups can form string-shaped micelle. The length of string-shaped micelle is preferably 50 nm or more.

In order to form the micelle, the concentration of the compound is preferably in the range of 1 to 50 wt. %, more preferably in the range of 7 to 30 wt. %. If the concentration is too low, the micelle is hardly formed. On the other hand, if the concentration is too high, the compound cannot be fully dissolved or dispersed and the viscosity of medium containing the micelle is undesirably increased to induce troubles.

The compound can be dissolved, emulsified or dispersed according to known methods. With respect to emulsification and dispersion, methods or processes known in the field of silver halide photography can be applied. Further, the solid dispersion method (disclosed in Japanese Patent Provisional Publication No. 63(1988)-271339) may be adopted. In the medium containing the micelle, other optional components (e.g., binder polymer) may be incorporated to prepare a coating solution for forming optically anisotropic layer. In particular, if a polarizing element is to be produced, a dichromatic dye is preferably added.

(Optically Anisotropic Layer)

In preparing a polarizing element, substantially colorless micelle is oriented in a definite direction so that light passing through the element may be polarized. In detail, force for orienting the micelle (hereinafter referred to as "orientation force") is applied to orient the micelle, and then relaxed to fix the orientation of the micelle.

As the orientation force, stress may be applied. The stress may be shear stress or normal stress. The shear stress is preferred. In coating with the solution containing the micelle, the shear stress can be applied to the micelle with coating means.

Coating methods by which the shear stress can be applied to the micelle are, for example, curtain coating, extrusion coating, roll coating, dip coating, spin coating, print coating, spray coating, and slide coating. Such coating method makes it possible to perform procedures of orientating and coating simultaneously. Preferably, the coating procedure is continuously performed so that the orientation procedure is continuously performed at the same time. For the continuous coating procedure, curtain coating, extrusion coating, roll coating, and slide coating are preferably adopted. As the coating means, die coater, blade coater and bar coater are preferred.

In place of applying the shear stress in the coating procedure, a magnetic or electric field may be applied to orient the substantially colorless micelles. The magnetic or electric field may be applied in the plane of optically anisotropic layer having been formed by the coating procedure.

The magnetic or electric field can be generated with various known means.

The magnetic field strength is preferably in the range of 0.05 to 4.0 T, more preferably in the range of 0.2 to 4.0 T.

The electric field strength is preferably in the range of 1 to 200 KV/cm, more preferably in the range of 10 to 200 KV/cm.

(Dichromatic Dye)

In preparing a polarizing element, a dichromatic dye as well as the substantially colorless micelle is preferably used.

Examples of the dichromatic dye include azo dyes, stilbene dyes, pyrazolone dyes, triphenyl methane dyes, quinoline dyes, oxazine dyes, thiazine dyes, and anthraquinone dyes. Water-soluble dyes are preferred. The dichromatic dye preferably has a hydrophilic group (e.g., sulfo, amino, hydroxyl).

Examples of the dichromatic dye further include C.I. direct yellow 12, C.I. direct orange 39, C.I. direct orange 72, C.I. direct red 39, C.I. direct red 79, C.I. direct red 81, C.I. direct red 83, C.I. direct red 89, C.I. direct violet 48, C.I. direct blue 67, C.I. direct blue 90, C.I. direct green 59 and C.I. direct acid red 37.

Japanese Patent Provisional Publication Nos. 1(1989)-161202, 1(1989)-172906, 1(1989)-172907, 1(1989)-183602, 1(1989)-248105, 1(1989)-265205 and 7(1995)-261024 describe the dichromatic dye. The dichromatic dye is used in the form of a free acid or a salt (alkali metal salt, ammonium salt, amine salt). Two or more dichromatic dyes may be used in combination.

The dichromatic dye enables a polarizing element to show a desired hue. For example, a dichromatic dye that shows black hue or a mixture obtained by mixing various dichromatic dyes to show black hue when polarizing axes are perpendicularly crossed is usable. The polarizing element comprising that dichromatic dye or mixture is excellent in polarizing light and improved in-transmittance when singly used.

The coating amount of dichromatic dye is preferably in the range of 0.01 to 50 g/m$^2$, more preferably in the range of 0.05 to 10 g/m$^2$.

(Support)

The optically anisotropic layer is generally formed on a support through a coating procedure. As the support, a paper sheet, a polymer film, a metal plate or a glass plate can be used.

In the case where a support provided thereon with the optically anisotropic layer is directly used as an optical film or a polarizing element, the support is preferably transparent. As the transparent support, a polymer film or a glass plate can be used. A polymer film is particularly preferred.

The transparent support has a light-transmittance of preferably 60% or more, more preferably 80% or more, most preferably 90% or more. Preferred polymers for the transparent support are, for example, polycarbonate, polysulfone, polyethersulfone, and cellulose acylate (e.g., cellulose acetate, cellulose acetate butylate). Further, commercially available polymer films (e.g., Zeonex and Zeonor, Zeon Corporation; ARTON, JSR corporation; Fujitac, Fuji Photo Film Co., Ltd.) can be used.

As the transparent support, a cellulose acylate film is particularly preferred.

The cellulose acylate film has a thickness preferably in the range of 5 to 500 µm, more preferably in the range of 20 to 200 µm, most preferably in the range of 20 to 100 µm.

The cellulose acylate film has a retardation value (Re) measured at 632.8 nm preferably in the range of 0 to 150 µm, more preferably in the range of 0 to 20 µm, most preferably in the range of 0 to 5 µm.

The cellulose acylate film has a tensile strength determined by the tensile test preferably in the range of 50 to 1,000 MPa, more preferably in the range of 100 to 300 Mpa. The modulus of elasticity determined by the tensile test is preferably in the range of 2.5 to 5.0 GPa, more preferably in the range of 3.0 to 5.0 Gpa. The elongation at break determined by the tensile test is preferably 10% or more, more preferably 20% or more. The moisture permeability of the cellulose acylate film is preferably in the range of 100 to 800 g/m$^2$·day, more preferably in the range of 300 to 600 g/m$^2$·day.

Cellulose, which is a starting material for preparing cellulose acylate used in the invention, can be generally obtained from cotton linter or wood pulp. Cellulose acylate derived from a mixture of cotton linter and wood pulp may be used. The cellulose acylate has acyl groups substituting for hydroxyls of cellulose, and the substituting acyl groups preferably satisfy all the following conditions (I) to (III):

$$57.5\% \leq A+B \leq 62.5\% \qquad (I)$$

$$48.8\% \leq A \leq 62.5\% \qquad (II)$$

$$0\% \leq B \leq 24.5\% \qquad (III)$$

in which A and B are substitution degrees of the acyl groups substituting for hydroxyls of cellulose, A is the substitution degree of acetyl group (i.e., acetylation ratio), and B is the substitution degree (i.e., acylation ratio) of acyl groups having 3 to 22 carbon atoms. Cellulose generally has three hydroxyls per one glucose unit, and the above numbers in the formulas mean percent ratios of acylation (i.e., acylation ratios). The acylation ratio is at the most 62.5%. The acetylation ratio A of cellulose triacetate is generally in the range of 57.5 to 62.5% (in this case, the ratio of non-substituted hydroxyls is at the most 13.4%). The acylation ratio B of cellulose triacetate is 0%. Not only cellulose triacetate but also a cellulose acylate containing 48.8% or more of acetyl groups, 24.5% or less of acyl groups having 3 to 22 carbon atoms and 13.4% or less of non-substituted hydroxyls is preferably used. In consideration of film characters, the ratio of acyl groups having 3 to 22 carbon atoms is preferably 10.3% or less.

The substitution degrees can be obtained by measuring and calculating the contents of acetic acid and fatty acids having 3 to 22 carbon atoms displacing hydroxyls of cellulose. The measurement can be carried out according to ASTM, D-817-91. An acyl-substitution degree as well as the substitution degree indicates how many hydroxyls are substituted. The acyl-substitution degree can be obtained according to the following formula:

$$\text{acyl-substitution degree} = (3.86 \times \text{acylation ratio})/(142.9 - \text{acylation ratio}).$$

An acylation ratio of 57.5 to 62.5% corresponds to an acyl-substitution degree of 2.6 to 3.0.

Preferred examples of the acyl group having 3 to 22 carbon atoms include propanoyl ($C_2H_5CO-$), butanoyl (n- or iso-$C_3H_7CO-$), valeryl (n-, iso-, sec- or tert-$C_4H_9CO-$), octanoyl, dodecanoyl, octadecanoyl and oleoloyl. Particularly preferred groups are propanoyl and butanoyl.

The acyl group is most preferably n-propionyl because a film of cellulose acylate substituted with n-propionyl has strong mechanical strength and good solubility. If the substitution degree of acetyl group is low, the resultant film has poor mechanical strength and heat resistance. Cellulose acylate highly substituted with acyl groups having 3 to 5 carbon atoms is well dissolved in an organic solvent, and even in that case the resultant film has preferable characters if the substitution degree of each group is in the above corresponding range.

The cellulose acylate has a (viscosity average) polymerization degree preferably in the range of 200 to 700, more preferably in the range of 250 to 550. It is generally said [for example, in "Cellulose Handbook (Japanese)", edited by H. Sobué and N. Migita, published by Asakura publishing Co. Ltd., (1958); "Lecture on Plastic Materials 17 (Japanese)", edited by H. Marusawa and K. Uda, published by The Nissan Kogyo Shimbun (1970)] that the polymerization degree must be 200 or more so that fibers or products of thus-polymerized cellulose acylate (including cellulose triacetate) has enough mechanical strength.

For determining the viscosity average polymerization degree (DP), the intrinsic viscosity $[\eta]$ of the cellulose acylate is measured by means of an Ostwald viscometer. From the measured viscosity $[\eta]$, the viscosity average polymerization degree is calculated according to the formula:

$$DP=[\eta]/Km$$

in which DP is a viscosity average polymerization degree, and Km is the constant of $6 \times 10^{-4}$.

The cellulose acylate film is preferably produced according to a solvent cast method. The solvent cast method comprises the steps of dissolving cellulose acylate and various additives in a solvent to prepare a dope, casting the dope onto an endless support such as a band or drum, and evaporating the solvent to form a film. Before casting the dope, the concentration of the dope is so adjusted that the solid content of the dope is in the range of 10 to 40 wt. %. The surface of the drum or band is preferably polished to give a mirror plane. The casting and drying stages of the solvent cast method are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035.

Two or more dopes may be cooperatively cast. In that case, the cellulose acylate solutions may be cast from nozzles provided at intervals in the transferring direction of the support to form a layered film. This co-casting method is described in, for example, Japanese Patent Provisional Publication Nos. 61(1986)-158414, 1(1989)-122419 and 11(1999)-198285. The solutions may be simultaneously cast from two nozzles to form a layered film. This method is described in, for example, Japanese Patent Publication No. 60(1985)-27562, Japanese Patent Provisional Publication Nos. 61(1986)-94724, 61(1986)-947245, 61(1986)-104813, 61(1986)-158413 and 6(1994)-134933.

Further, the method described in Japanese Patent Provisional Publication No. 56(1981)-162617 can be also adopted. In that method, a highly viscous cellulose acetate solution is enclosed with a low viscous one, and then the thus-combined solutions are simultaneously extruded and cast.

Examples of the solvent in which cellulose acylate is dissolved include hydrocarbons (e.g., benzene, toluene), hydrocarbon halides (e.g., methylene chloride, chlorobenzene), alcohols (e.g., methanol, ethanol, diethylene glycol), ketones (e.g., acetone), esters (e.g., ethyl acetate, propyl acetate), and ethers (e.g., tetrahydro furan, methyl cellosolve).

As the solvent, a hydrocarbon halide having 1 to 7 carbon atoms is preferred. Further, methylene chloride is more preferred. It is particularly preferred to use a mixture of methylene chloride and an alcohol having 1 to 5 carbon atoms, in consideration of solubility of cellulose acylate. The mixture also makes the formed film easily peeled from the support, and improves properties (such as mechanical strength and optical characters) of the resultant film. The amount of alcohol is preferably in the range of 2 to 25 wt. %, more preferably in the range of 5 to 20 wt. % based on the total amount of the solvent. Examples of the alcohol include methanol, ethanol, n-propanol, isopropanol and n-butanol. Methanol, ethanol and n-butanol are preferred. Two or more alcohols may be mixed to use.

In consideration of environmental protection, a solvent without methylene chloride has been recently proposed. Preferred examples of the solvent replacing methylene chloride include an ether having 2 to 12 carbon atoms, a ketone having 3 to 12 carbon atoms and an ester having 2 to 12 carbon atoms. Two or more ethers, ketones and esters may be mixed to use. The ether, ketone and ester may have a cyclic structure. A compound having two or more functional groups of the ether (—O—), ketone (—CO—) and ester (—COO—) can also be used as the solvent. The solvent can have another functional group such as alcoholic hydroxyl. If the solvent is the compound having two or more functional groups, the number of carbon atoms is in any of the above ranges.

Examples of the ether having 2 to 12 carbon atoms include diisopropyl ether, dimethoxymethane, 1,4-dioxane, 1,3-dioxolane, tetrahydrofuran, anisole and phenetol.

Examples of the ketone having 3 to 12 carbon atom include acetone, methyl ethyl ketone, diethyl ketone, diisobutyl ketone, cyclohexanone and methylcyclohexanone.

Examples of the ester having 2 to 12 carbon atoms include ethyl formate, propyl formate, pentyl formate, methyl acetate, ethyl acetate, and pentyl acetate.

Examples of the compounds having two or more functional groups include 2-ethoxyethyl acetate, 2-methoxyethanol and 2-butoxyethanol.

Besides the cellulose acylate, the dope may contain other solid contents, which are left after the solvent is evaporated. Examples of the solid contents other than cellulose acylate include plasticizer, UV absorber, inorganic fine particles, thermal stabilizer, anti-static agent, fire retardant, slipping agent, oil, releasing agent, and hydrolysis inhibitor. The thermal stabilizer is generally a salt of alkaline earth metal (e.g., calcium, magnesium).

The plasticizer is preferably a phosphate ester or a carbonate ester. Examples of the phosphate ester include triphenyl phosphate (TPP), tricresyl phosphate (TCP), cresyldiphenyl phosphate, octyldiphenyl phosphate, diphenylbiphenyl phosphate, trioctyl phosphate, and tributyl phosphate. Typical examples of the carbonate ester are phthalate esters and citrate esters. Examples of the phthalate esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citrate esters include triethyl o-acetylcitrate (OACTE), tributyl o-acetylcitrate (OACTB), acetyltriethyl citrate, and acetyltributyl citrate. Besides the above, butyl oleate, methylacetyl ricinolate, dibutyl sebacate and various trimellitic esters (e.g., trimethyl trimellitate) are also usable. Examples of glycolate ester include triacetin, tributyrin, butylphthalylbutyl glycolate, ethylphthalylethyl glycolate, and methylphthalylethyl glycolate.

Preferred plasticizers are triphenyl phosphate, biphenyldiphenyl phosphate, tricresyl phosphate, cresyldiphenyl phosphate-, tributyl phthalate, dimethyl phthalate, diethyl phthalate, dibutyl phthalate, dioctyl phthalate, diethylhexyl phthalate, triacetin, ethylphthalylethyl glycolate, and trimethyl trimellitate. More preferred plasticizers are triphenyl phosphate, biphenyldiphenyl phosphate, diethyl phthalate, ethylphthalylethyl glycolate, and trimethyl trimellitate.

Two or more plasticizers may be used in combination. The amount of plasticizer is preferably in the range of 5 to 30 wt. %, more preferably in the range of 8 to 16 wt. %. In preparing the cellulose acylate solution, the plasticizer may be added together with cellulose acylate and the solvent. During or after preparing the solution, the plasticizer may be added.

As the UV absorber, preferred are salicylic esters (salicylates), benzophenones, benzotriazoles, benzoates, cyanoacrylates and nickel complex salts. Salicylic esters, benzophenones and benzotriazoles are more preferred.

Examples of the salicylic esters include phenyl salicylate, p-octylphenyl salicylate and p-tert-butylphenyl salicylate. Examples of the benzophenones include 2,4-dihydroxybenzophenone, 2-hydroxy-4-acetoxybenzophenone, 2-hydroxy-4-methoxybenzophenone, 2,2'-dihydroxy-4-methoxybenzophenone, 2,2'-di-hydroxy-4,4'-methoxybenzophenone, 2-hydroxy-4-n-octoxybenzophenone, 2-hydroxy-4-dodecyloxybenzophenone, and 2-hydroxy-4-(2-hydroxy-3-methacryloxy)propoxybenzophenone. Examples of the benzotriazoles include 2-(2'-hydroxy-3'-tert-butyl-5'-methylphenyl)-5-chlorobenzotriazole, 2-(2'-hydroxy-5'-tert-butylphenyl)benzotriazole, 2-(2'-hydroxy-3',5'-di-tert-amylphenyl)benzotriazole, 2-(2'-hydroxy-3',5'-di-tert-butylphenyl)-5-chlorobenzotriazole, and 2-(2'-hydroxy-5'-tert-octylphenyl)benzotriazole.

Compounds preferably used as the UV absorber are 2-hydroxy-4-methoxybenzophenone, 2,2'-di-hydroxy-4,4'-methoxybenzophenone, 2-(2'-hydroxy-3'-tert-butyl-5'-methylphenyl)-5-chlorobenzotriazole, 2-(2'-hydroxy-5'-tert-butylphenyl)benzotriazole, 2-(2'-hydroxy-3',5'-di-tert-amylphenyl)benzotriazole, and 2-(2'-hydroxy-3',5'-di-tert-butylphenyl)-5-chlorobenzotriazole.

If two or more UV absorbers absorbing ultraviolet light in different wavelength ranges are used in combination, the element can be highly protected from ultraviolet light in a wide wavelength region. The amount of UV absorber is preferably in the range of 0.01 to 5 wt. %, more preferably in the range of 0.1 to 3 wt. % based on the amount of cellulose acylate. The UV absorber can be dissolved simultaneously with cellulose acylate. Otherwise, it may be added to the dope after cellulose acylate is dissolved. Further, a solution of the UV absorber may be added by means of a stirrer (e.g., static mixer) to the dope immediately before the dope is cast. If so, it is easy to control the spectral absorption character.

Inorganic fine particles can be mixed with cellulose acylate. Examples of inorganic substances for the particles include silica, kaolin, talc, diatomaceous earth, quartz, calcium carbonate, barium sulfate, titanium oxide and alumina.

Before added to the dope, the fine particles are preferably dispersed in a binder solution by means of a stirrer (e.g., high-speed mixer, ball mill, attriter, ultrasonic disperser). As the binder, cellulose acylate is preferred. The disperse medium is preferably similar to the dope. The number average size of the particles is preferably in the range of 0.01 to 100 $\mu$m, more preferably in the range of 0.1 to 10 $\mu$m. The dispersion of fine particles can be added simultaneously with dissolving cellulose acylate. Otherwise, it may be added to the dope after cellulose acylate is dissolved. The dispersion is preferably added by means of a stirrer (e.g., static mixer) to the dope immediately before the dope is cast.

A releasing agent may be used so that the film formed according to the solvent cast method can be easily peeled from the support. Surface-active agents are effectively used as the releasing agent. Nonionic or cationic ones are preferred. Examples of the cation include ions of phosphate, sulfonate and carboxylate. The releasing agents of surface-active agents are described in Japanese Patent Provisional Publication No. 61(1986)-243837.

In the case where the transparent support is placed on the liquid crystal side, the birefringence of the support is preferably controlled. The principal refractive indexes in plane (nx, ny), that in the thickness direction (nz) and the thickness (d) are preferably controlled to satisfy the condition: nz<ny<nx, which means having biaxiality. Further, the Rth retardation value defined by the formula: $\{(nx+ny)/2-nz\} \times d$ is controlled to be preferably in the range of 20 to 400 nm, more preferably in the range of 30 to 200 nm. Furthermore, the Re retardation value defined by the formula: $|nx-ny| \times d$ is controlled to be preferably 100 nm or less, more preferably 60 nm or less.

In the case where the transparent support is placed on the film surface of the opposite side to the liquid crystal, there is no restriction on the birefringence.

(Binder Polymer)

The optically anisotropic layer can contain a binder polymer.

The polymer is preferably cross-linked. A cross-linkable polymer may be used to form by itself the cross-linking, or the cross-linking may be formed with a cross-linking agent. Further, a cross-linkable polymer may be used in combination with a cross-linking agent.

In the case where the polymer is cross-linked with a cross-linking agent, a compound having high reactivity is used as the cross-linking agent so that a linking group derived from the agent may be introduced into the polymer.

The cross-linking reaction can be promoted by light, heat or pH variation.

Examples of the binder polymer include polymethyl methacryalte, arylic/mathacrylic acid copolymer, styrene/maleimide copolymer, poly(N-methylol acrylamide), carboxymethyl cellulose, gelatin, polyvinyl alcohol, denatured polyvinyl alcohol, styrene/vinyl toluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethyl cellulose, polyethylene, polypropylene, and polycarbonate. Further, a silane-coupling agent can be added as the binder polymer.

(Cross-Linking Agent)

The cross-linking agent can be used to cross-link the binder polymer. The agent can be also used to cross-link the dichromatic dye or components of the optically anisotropic micelle.

The amount of the cross-linking agent is preferably less than 50 wt. %, more preferably in the range of 0.1 to 20 wt. %, most preferably in the range of 0.5 to 15 wt. %. After the cross-linking reaction is completed, the cross-linking agent remains in the optically anisotropic layer preferably in an amount of less than 1.0 wt. %, and more preferably in an amount of less than 0.5 wt. %.

(Protective Layer)

A protective layer can be provided on the polarizing element.

The protective layer is preferably a highly transparent polymer film, which the aforementioned transparent support is also preferred to be. The film can be laminated on the polarizing element with an adhesive. Otherwise, the optically anisotropic layer is coated with a solution of monomers, which are then polymerized to form the protective layer. The protective layer thus formed by coating and polymerization can be made thinner than that provided by laminating a film. As the monomer, a compound having vinyl, vinyloxy, acryloyl or methacryloyl as a polymerizable group is preferably used.

(Use)

The polarizing element is advantageously used in combination with other optical members (e.g., optical compensatory sheet, brightness-increasing film). It is preferred to preciously control the positions of the transmission axis of polarizing element and the slow axis of each optical member.

The optical members are preferably formed through a coating procedure. For example, an optical compensatory sheet coated with discotic liquid crystal molecules (described in Japanese Patent Provisional Publication No. 6(1994)-214116, U.S. Pat. Nos. 5,583,679, 5,646,703 and German Patent No. 3,911,620A1) is preferably used. An optical compensatory sheet coated with rod-like liquid crystal molecules is described in Japanese Patent Publication No. 7(1995)-35924. A brightness-increasing film prepared by a coating procedure is described in Japanese Patent Provisional Publication No. 11(1999)-149015.

The optical compensatory sheet preferably comprises an optically anisotropic layer formed from discotic or rod-like liquid crystal molecules. The optically anisotropic layer is formed through the steps of aligning the discotic or rod-like liquid crystal molecules and fixing the alignment.

The discotic liquid crystal molecules generally have a large birefringence and can be oriented in various alignments, and accordingly an optical compensatory sheet obtained by using the discotic liquid crystal molecules has a specific optical characteristic that cannot be obtained by a conventional stretched birefringencial film.

The polarizing element is preferably used as a polarizing plate in a liquid crystal display, particularly in a display of transmission type.

The liquid crystal display of transmission type comprises a liquid crystal cell and two polarizing plates arranged on both sides thereof. The liquid crystal cell comprises a pair of electrode substrates and liquid crystal inserted between them.

The optically compensatory sheet is provided between the liquid crystal cell and one or each of the polarizing plates.

The liquid crystal cell preferably works according to OCB mode, VA mode or TN mode.

In a liquid crystal cell of VA mode, rod-like liquid crystal molecules are essentially vertically aligned while voltage is not applied.

The liquid crystal cell of VA mode include some types: (1) a liquid crystal cell of VA mode in a narrow sense (described in Japanese Patent Provisional Publication No. 2(1990)-176625), in which rod-like liquid crystal molecules are essentially vertically aligned while voltage is not applied, and the molecules are essentially horizontally aligned while voltage is applied; (2) liquid crystal cells of MVA mode (described in SID97, Digest of tech. Papers, 28(1997), 845), in which the VA mode is modified to be multi-domain type so as to enlarge the viewing angle; (3) a liquid crystal cell of n-ASM mode (described in Japan liquid crystal forum (1998), 58-59), in which rod-like liquid crystal molecules are essentially vertically aligned while voltage is not applied, and the molecules are essentially oriented in twisted multi-domain alignment while voltage is applied; and (4) a liquid crystal cell of SURVAIVAL mode (published in LCD International '98).

The liquid crystal cell of OCB mode is a liquid crystal cell of bend alignment mode in which rod-like liquid crystal molecules in upper part and ones in lower part are essentially reversely (symmetrically) aligned. A liquid crystal display having the liquid crystal cell of bend alignment mode is disclosed in U.S. Pat. Nos. 4,583,825 and 5,410,422. Since rod-like liquid crystal molecules in upper part and ones in lower part are symmetrically aligned, the liquid crystal cell of bend alignment mode has self-optical compensatory function. Therefore, this mode is referred to as OCB (optically compensatory bend) mode. The liquid crystal display of bend alignment mode has an advantage of responding rapidly.

In a liquid crystal cell of TN mode, rod-like liquid crystal molecules are essentially horizontally aligned while voltage is not applied and also are oriented in a twisted alignment with a twisted angle of 60 to 120°. The liquid crystal cell of TN mode is widely used in color TFT liquid crystal displays, and hence is described in many publications.

EXAMPLE 1

(Preparation of Colorless Micelle)

Cromolyn sodium (Wako Pure Chemical Industries, Ltd.) was weighed out in the amount of 6 g, and dissolved in 34 ml of water at room temperature. The solution was treated with an ultrasonic homogenizer (UH-50, SMT) for 10 minutes, and further stirred at 80° C. for 30 minutes to prepare a homogeneous dispersion of colorless micelle. Through this procedure, the micelle was easily formed.

(Preparation of Optical Film)

An appropriate amount of the substantially colorless micelle dispersion was weighed out and applied on a support film of saponified cellulose triacetate by means of a coating rod bar #3. During the coating procedure, the support was being transferred at 10 m/minute and the bar was not rotating. Thus, an optical film was prepared. Since the coating of the dispersion caused sufficient shear stress, optical anisotropy was obtained without any other procedure.

The optical concentration of the prepared optical film was measured with a densitometer (X-rite), to find 0.05 in the visible wavelength region.

(Evaluation of Optical Film)

The retardation values of the optical film were measured by means of an ellipsometer [M-150, JASCO CORPORATION], to obtain a birefringence ($\Delta n$). The result is set forth in Table 1.

EXAMPLE 2

(Preparation of Colorless Micelle)

The compound (1) was weighed out in the amount of 6 g, and dissolved in 34 ml of water at room temperature. The solution was treated with an ultrasonic homogenizer (UH-50, SMT) for 10 minutes, and further stirred at 80° C. for 30 minutes to prepare a homogeneous dispersion of colorless micelle. Through this procedure, the micelle was easily formed.

(Preparation of Optical Film)

An appropriate amount of the substantially colorless micelle dispersion was weighed out and applied on a support film of saponified cellulose triacetate by means of a coating rod bar #3. During the coating procedure, the support was being transferred at 10 m/minute and the bar was not rotating. Thus, an optical film was prepared. Since the coating of the dispersion caused sufficient shear stress, optical anisotropy was obtained without any other procedure.

The optical concentration of the prepared optical film was measured with a densitometer (X-rite), to find 0.05 in the visible wavelength region.

(Evaluation of Optical Film)

The retardation values of the optical film were measured by means of an ellipsometer [M-150, JASCO CORPORATION], to obtain a birefringence (Δn). The result is set forth in Table 1.

EXAMPLE 3

The procedure of Example 2 was repeated except that the compound (2) was used, to prepare an optical film.

The optical concentration of the prepared optical film was measured with a densitometer (X-rite), to find 0.05 in the visible wavelength region.

The prepared optical film was evaluated in the same manner as in Example 2. The result is set forth in Table 1.

EXAMPLE 4

The procedure of Example 2 was repeated except that the compound (4) was used, to prepare an optical film.

The optical concentration of the prepared optical film was measured with a densitometer (X-rite), to find 0.05 in the visible wavelength region.

The prepared optical film was evaluated in the same manner as in Example 2. The result is set forth in Table 1.

EXAMPLE 5

The micelle dispersion of the compound (1) prepared in Example 2 was applied on a support film of saponified cellulose triacetate in the amount of 2 ml/m². Magnetic field parallel to the support was then applied to the film in the amount of 0.5 T, and was kept for 1 minute. The thus treated film was dried to prepare an optical film.

The optical concentration of the prepared optical film was measured with a densitometer (X-rite), to find 0.05 in the visible wavelength region.

The prepared optical film was evaluated in the same manner as in Example 2. The result is set forth in Table 1.

EXAMPLE 6

The micelle dispersion of the compound (1) prepared in Example 2 was applied on a support film of saponified cellulose triacetate in the amount of 2 ml/m². Electric field parallel to the support was then applied to the film in the amount of 20 kV/cm, and was kept for 1 minute. The thus treated film was dried to prepare an optical film.

The optical concentration of the prepared optical film was measured with a densitometer (X-rite), to find 0.05 in the visible wavelength region.

The prepared optical film was evaluated in the same manner as in Example 2. The result is set forth in Table 1.

TABLE 1

| Optical film | Compound of micelles | Slow axis of film | Birefringence (Δn) |
|---|---|---|---|
| Ex. 1 | Cromolyn sodium | Perpendicular to transfer | 0.09 |
| Ex. 2 | (1) | Perpendicular to transfer | 0.15 |
| Ex. 3 | (2) | Perpendicular to transfer | 0.20 |
| Ex. 4 | (4) | Perpendicular to transfer | 0.16 |
| Ex. 5 | (1) | Direction of magnetic filed | 0.13 |
| Ex. 6 | (1) | Direction of electric filed | 0.11 |

EXAMPLE 7

(Preparation of Polarizing Element)

To the micelle dispersion of the compound (1) prepared in Example 2, a 10 wt. % aqueous solution of dichromatic dye (Direct red 75, Aldrich) was added in the amount of 30 wt. % to prepare a coating solution.

An appropriate amount of the coating solution was weighed, and manually applied on a support film of saponified cellulose triacetate by means of a coating rod bar #3. Thus, a polarizing element was prepared. Since the manual coating of the dispersion caused sufficient shear stress, optical anisotropy was obtained without any other procedure.

The optical concentration of the prepared element was measured with a densitometer (X-rite), to find 0.05 in the visible wavelength region.

(Evaluation of Polarizing Element)

The polarizing degree and transmittance of the polarizing element were measured at 550 nm by means of a spectrophotometer (UV3100PC, Shimadzu Seisakusho Ltd.) equipped with a large polarizer (Assy). The results are set forth in Table 2.

EXAMPLE 8

(Preparation of Polarizing Element)

The coating solution prepared in Example 7 was applied on a long band-shaped support film of saponified cellulose triacetate by means of a bar-coating machine. During the coating procedure, the support was being transferred at 15 m/minute, the bar was rotating at the rotating speed of 50 m/minute, the support was tensed with the tension of 1 kgf/cm, and the bar was inclined at 70°.

FIG. 1 schematically illustrates an inclined angle of the bar to the long band-shaped support.

As shown in FIG. 1, the coating solution was applied with the bar inclined at the inclined angle θ (70° in Example 5) to the lateral direction of the long band-shaped support.

Thus, a long band-shaped polarizing element having a transmission axis inclined at 45° to the longitudinal direction of the support was obtained. The obtained element was evaluated in the same manner in Example 7. The results are set forth in Table 2.

TABLE 2

| Polarizing element | Compound of micelles | Transmission axis of polarizing element | Degree of Polarization | Transmitance along transmission axis |
|---|---|---|---|---|
| Ex. 7 | (1) | Direction of transfer | 82% | 20% |
| Ex. 8 | (1) | 45° to transfer | 80% | 21% |

(Production of Chips for Liquid Crystal Display)

Chips corresponding to 15-inches type were cut out by means of a guillotine cutter from the long band-shaped polarizing element prepared in Example 8.

Figure 2:
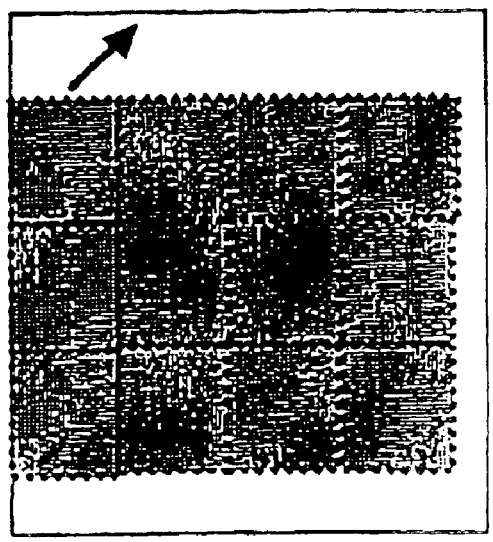
FIG. 2 schematically illustrates a pattern of cutting out chips from a polarizing element that has a shape showing a longitudinal direction prepared in Example 5.

FIG. 2 schematically illustrates a pattern of cutting out the chips from the element prepared in Example 8.

The polarizing element prepared in Example 8 had a transmission axis at the angle of 45° (in the direction shown by the arrow in FIG. 2). On the other hand, a square chip of polarizing element for liquid crystal display must have a transmission axis in the diagonal direction (namely, at 45° to the side). Accordingly, from the polarizing element prepared in Example 8, the square chips having 15-inch-long sides were economically cut out without loss, as shown in FIG. 2.

Figure 3:
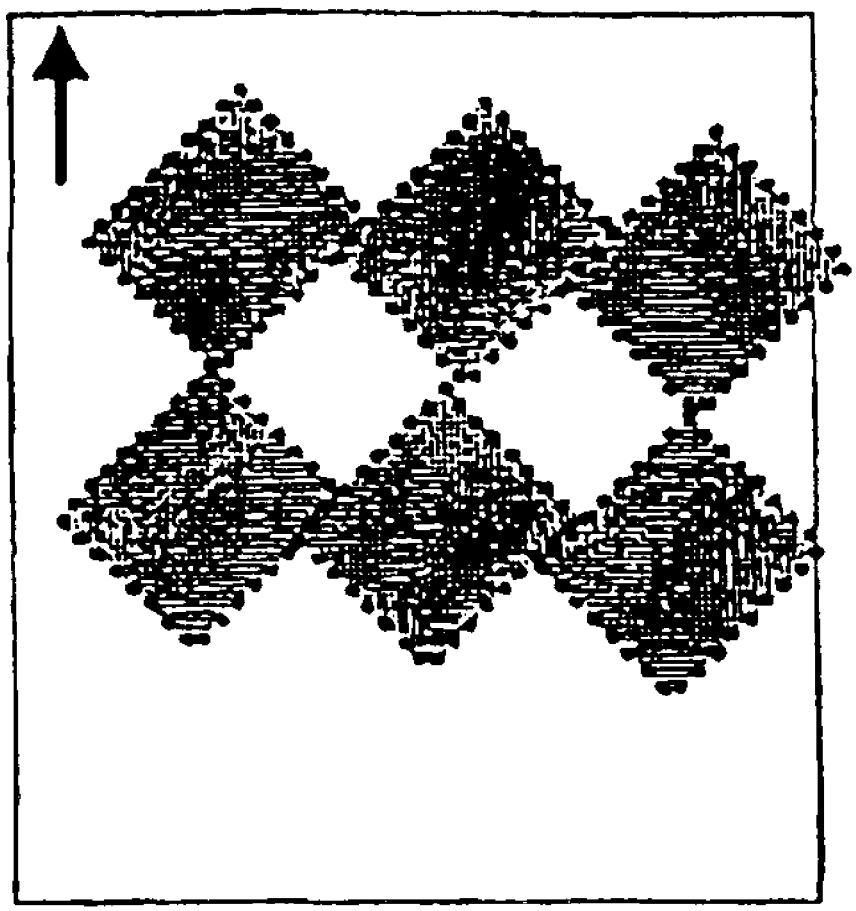
FIG. 3 schematically illustrates a pattern of cutting out chips from a conventional polarizing element that has a shape showing a longitudinal direction.

FIG. 3 schematically illustrates a pattern of cutting out the chips from a conventional long band-shaped polarizing element.

The conventional long band-shaped polarizing element had a transmission axis in the longitudinal direction (in the direction shown by the arrow in FIG. 3). On the other hand, a square chip of polarizing element for liquid crystal display must have a transmission axis in the diagonal direction (namely, at 45° to the side). Accordingly, if the square chips having 15-inch-long sides are cut out from the conventional polarizing element, a considerable amount of loss was wastefully produced as shown in FIG. 3.

What is claimed is:

1. A substantially colorless optically anisotropic material comprising optically anisotropic micelles that are oriented in a definite direction, wherein the optically anisotropic material comprises the micelles in a concentration of 1 to 50 wt.%.

2. The substantially colorless optically anisotropic material as defined in claim 1, wherein the material is lyotropic liquid crystal.

3. The substantially colorless optically anisotropic material as defined in claim 1, wherein the optically anisotropic micelles comprise a compound having two aromatic melamine groups.

4. An optical film comprising a transparent support and an optically anisotropic layer, wherein the optically anisotropic layer comprises a compound having two aromatic melamine groups represented by the formula (I):

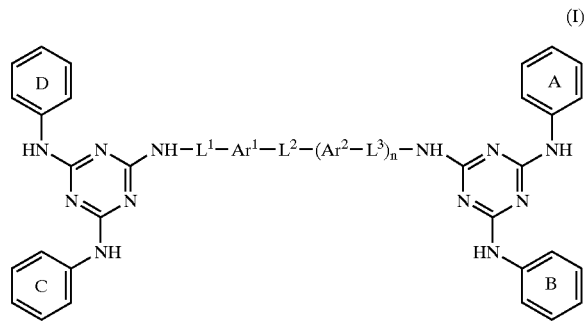

in which each of $L^1$ and $L^3$ independently is a single bond or an alkylene group having 1 to 6 carbon atoms; $L^2$ is a single bond, an alkylene group having 1 to 6 carbon atoms, —O—, —S— or —NH—; each of $Ar^1$ and $Ar^2$ independently is phenylene or naphthylene; n is 0 or 1; and at least one of the benzene rings A, B, C and D has sulfo or a salt thereof as a substituent group.

5. The optical film as defined in claim 4, wherein the optically anisotropic layer comprises micelles of the compound having two aromatic melamine groups represented by the formula (I).

6. A polarizing element comprising a substantially colorless layer in which optically anisotropic micelles are oriented in a definite direction and in which a dichromatic dye is present along the oriented direction of the optically anisotropic micelles to polarize light transmitted through the element.

7. The polarizing element as defined in claim 6, wherein the optically anisotropic micelles comprise a compound having two aromatic melamine groups.

8. The polarizing element as defined in claim 7, wherein the compound having two aromatic melamine groups is represented by the formula (I):

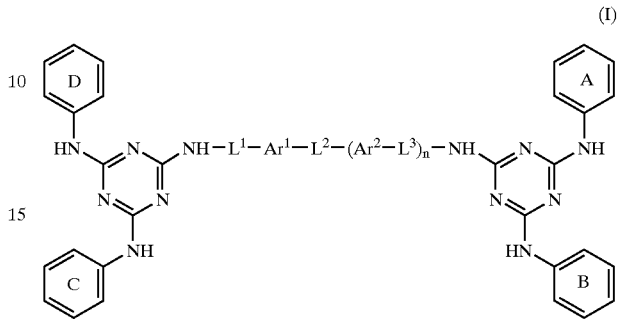

which each of $L^1$ and $L^3$ independently is a single bond or an alkylene group having 1 to 6 carbon atoms; $L^2$ is a single bond, an alkylene group having 1 to 6 carbon atoms, —O—, —S— or —NH—; each of $Ar^1$ and $Ar^2$ independently is phenylene or naphthylene; n is 0 or 1; and at least one of the benzene rings A, B, C and D has sulfo or a salt thereof as a substituent group.

9. The polarizing element as defined in claim 6, wherein the element has a shape showing a longitudinal direction, and the element has an absorption axis that is neither parallel nor perpendicular to the longitudinal direction.

10. A method for orientation of optically anisotropic micelles comprising steps of: applying force to optically anisotropic micelles contained in a substantially colorless material, wherein the substantially colorless material comprises the micelles in a concentration of 1 to 50 wt.%, to orient the micelle in a definite direction; and then relaxing the force.

11. The method as defined in claim 10, wherein the force for orienting the micelles is shear stress.

12. A process for preparation of an optical film comprising a step of coating a transparent support with a substantially colorless dispersion of optically anisotropic micelles, wherein the dispersion comprises the micelles in a concentration of 1 to 50 wt.%, according to a bar-coating method, a die-coating method or a blade-coating method to form an optically anisotropic layer on the transparent support.

13. The process as defined in claim 12, wherein the shear stress is applied along a direction in the bar-coating method, the die-coating method or the blade-coating method, and the formed optically anisotropic layer has a slow axis that is parallel or perpendicular to the direction.

14. The process as defined in claim 12, wherein the transparent support has a shape showing a longitudinal direction, and the dispersion is coated according to the bar-coating method in which a bar for coating is moved along a direction that is neither parallel nor perpendicular to the longitudinal direction of the transparent support to prepare the optical film having a slow axis that is neither parallel nor perpendicular to the longitudinal direction of the transparent support.

15. A process for preparation of an optical film comprising steps of: coating a transparent support with a substantially colorless dispersion of optically anisotropic micelles, wherein the dispersion comprises the micelles in a concentration of 1 to 50 wt.%; and then orienting the optically anisotropic micelles by applying an electric or magnetic field to form an optically anisotropic layer.

* * * * *